Sept. 16, 1958      O. E. HILL      2,851,827

MULTIPLE WHEEL GRINDING MACHINE

Filed Nov. 8, 1957      4 Sheets-Sheet 1

Fig. 1

INVENTOR
OIVA E. HILL
BY
Harold W. Eaton
ATTORNEY

Sept. 16, 1958 O. E. HILL 2,851,827
MULTIPLE WHEEL GRINDING MACHINE
Filed Nov. 8, 1957 4 Sheets-Sheet 2

INVENTOR
OIVA. E. HILL
BY
Harold W. Eaton
ATTORNEY

United States Patent Office 2,851,827
Patented Sept. 16, 1958

2,851,827

MULTIPLE WHEEL GRINDING MACHINE

Oiva E. Hill, West Boylston, Mass., assignor to Norton Company, Worcester, Mass., a corporation of Massachusetts Application November 8, 1957, Serial No. 695,395

10 Claims. (Cl. 51—95)

The invention relates to grinding machines and more particularly to a multiple wheel grinding machine.

One object of the invention is to provide a simple and thoroughly practical multiple wheel grinding machine having a plurality of spaced grinding wheels which are arranged simultaneously to grind a plurality of spaced portions on a work piece. Another object is to provide a multiple wheel truing apparatus having a plurality of spaced truing tools for simultaneously truing a plurality of spaced grinding wheels. Another object is to provide a compensating mechanism simultaneously to advance a plurality of truing tools and to impart a compensating adjustment to the wheel feeding mechanism before each truing operation. Another object is to provide an automatic unwind and a wind movement to the grinding wheel feeding and to the truing feed mechanism simultaneously with the compensating adjustments thereof.

Another object is to provide an independent truing tool feeding mechanism whereby each of the truing tools may be incrementally adjusted to compensate for wheel wear caused by grinding or truing tool wear caused by truing operations. A further object is to provide an independent work gauge for each portion of the work piece to be ground which is operatively connected to actuate the compensating mechanism of the corresponding truing tool automatically to advance the truing tool so as to compensate for truing tool wear when that portion of the work piece reaches size before the other portions so as to compensate for oversize. Another object is to provide an automatic control for the truing apparatus which is actuated by and in timed relation with the rearward movement of the rear slide so as to initiate the truing cycle after each work piece has been ground.

Another object is to provide an unwind and a wind movement of each truing tool compensator each time the compensator is actuated. Another object is to impart a minute feed increment to advance the grinding wheel slide and to impart a corresponding minute feeding increment, simultaneously to all of the truing tools and simultaneously to impart an unwind and a wind rotation to the grinding wheel feed and the truing tool feed mechanisms before each pass of the truing tools across the operative faces of the grinding wheels. Another object is to provide a truing apparatus which may be operated continuously to true a plurality of spaced grinding wheels in which the grinding wheels and the truing tools are automatically advanced by a minute distance before each traversing movement and in which an unwind and a wind motion is imparted to the grinding wheels and to the truing tool feeding mechanisms at the time of each feeding movement thereof. Other objects will be in part obvious or in part pointed out hereinafter.

One embodiment of the invention has been illustrated in the drawings in which.

An improved grinding machine has been illustrated in the drawings comprising a base 10 which supports a longitudinally movable work table 11 on a flat-way 12 and a V-way 13 formed on the upper surface of the base 10.

A manually operable traversing mechanism may be provided for imparting a longitudinal adjustment to the table 11. This mechanism comprises a manually operable traverse wheel 15 which is rotatably supported on the front of the machine base and is operatively connected through a gear and rack mechanism (not shown) with the table 11. This mechanism is an old and well known mechanism in the grinding machine art and may be the same as that shown in the expired U. S. Patent No. 762,838 to C. H. Norton dated June 14, 1904, to which reference may be had for details of disclosure not contained herein.

The table 11 is provided with a rotatable work support comprising a motor driven headstock 16 which is provided with a driving motor 17. The headstock 16 is provided with a headstock center 18. The table 11 is also provided with a footstock 19 having a footstock center 20. The centers 18 and 20 serve as a rotatable support for opposite ends of a work piece 21 having a plurality of spaced portions 21a, 21b, 21c, and 21d to be ground.

Figure 1:
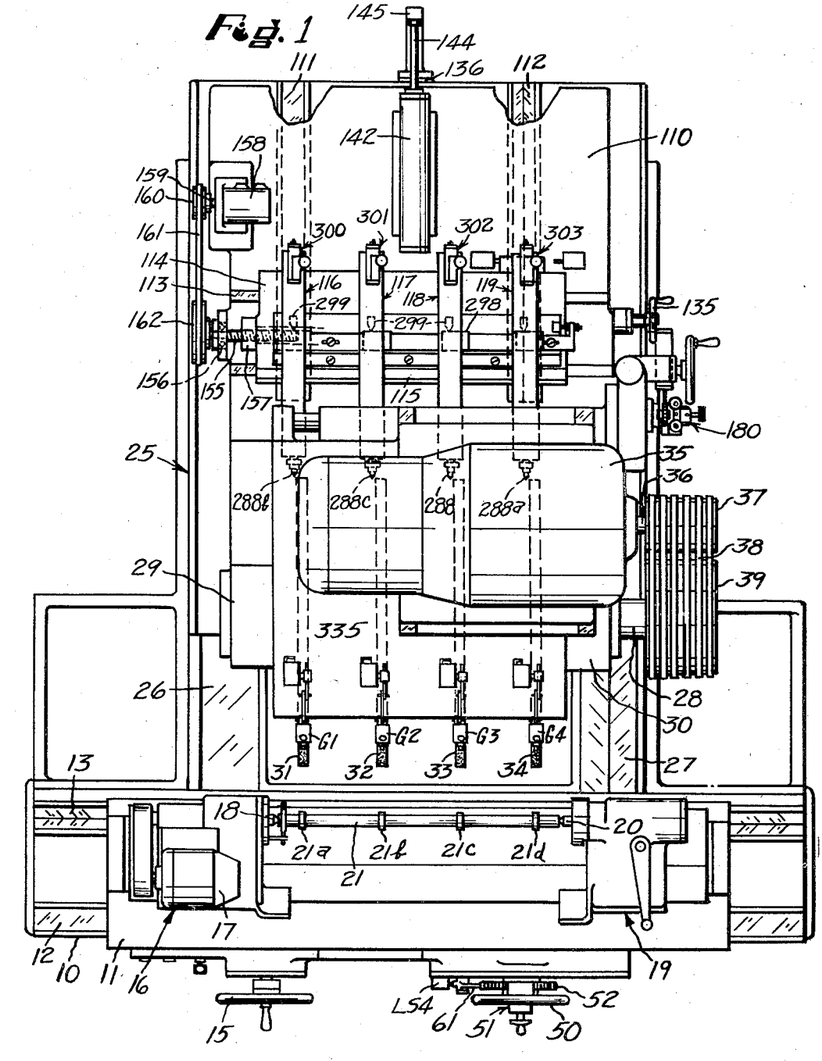
Fig. 1 is a plan view of the grinding machine.

The base 10 also serves as a support for a transversely movable wheel slide 25 which is arranged to slide transversely relative to the base 10 on a flat-way 26 and a V-way 27 (Figure 1). The wheel slide 25 is provided with a rotatable wheel spindle 28 which is journalled in spaced bearings 29 and 30 carried by the slide 25. The spindle 28 is provided with a plurality of spaced grinding wheels 31, 32, 33 and 34 which are spaced simultaneously to grind the spaced portions 21a, 21b, 21c and 21d.

The wheel spindle 28 and grinding wheels are driven by an electric motor 35 which is mounted on the upper surface of the wheel slide 25. The motor 35 is provided with a motor shaft 36 which supports a multiple V-groove pulley 37. The pulley 37 is connected by multiple V-belts 38 with a multiple groove pulley 39.

A feeding mechanism is provided for imparting a transverse movement to the wheel slide 25 comprising a rotatable feed screw 40, the left hand end of which is slidably keyed within a rotatable sleeve 41. The sleeve 41 is journalled in an anti-friction bearing 42 which is in turn supported by the base 10. The right hand end of the feed screw 40 (Figure 2) is connected to a slidably mounted sleeve 43 which is supported within a cylindrical aperture 44 formed within the base 10. A rotatable feed nut 45 meshes with or engages the feed screw 40. The nut 45 is rotatably journalled in spaced anti-friction bearings 46 and 47 which are carried by a bracket 48 depending from the underside of the wheel slide 25.

A manually operable mechanism is provided for imparting a rotary motion to the feed screw 40. This mechanism comprises a manually operable feed wheel 50 which is rotatably supported on the front of the machine base 10. The feed wheel 50 is provided with a micrometer adjusting mechanism 51 which is old and well known in the art. The feed wheel is operatively connected to impart a rotary motion to the gear 52. A gear 53 is mounted to rotate with the gear 52 and meshes with a gear 54 mounted on the left hand end of a rotatable shaft 55. A gear 56 is mounted on the right hand end of the shaft 55 and meshes with an intermediate gear 57. The intermediate gear 57 meshes with a gear 58 mounted on the left hand end of a rotatable shaft 59. The right hand end of the shaft 59 is slidably keyed within the rotatable sleeve 41. The micrometer feed adjusting mechanism 51 is provided with a stop abutment 60. A feed pawl 61 is pivotally supported by a stud 62 on the front of the machine face 10. When the feed wheel 50 is rotated in a counter clockwise direction, a rotary motion is imparted to the feed screw 40 to cause an infeeding movement of the grinding wheel which continues until the stop abutment 60 engages a stop surface 63 formed on the upper end of the feed pawl 61. Before the stop abutment 60 engages the stop surface 63, a cam 64 formed integral with the stop abutment 60 engages a correspondingly shaped surface on the upper end of the feed pawl 61 to rock it in a counter clockwise direction thereby actuating a limit switch LS4. The function of the limit switch LS4 will be described hereinafter.

A fluid pressure mechanism is provided for imparting a rapid approaching and receding movement to the grinding wheels 31 rapidly to position the wheel into operative relation with the work piece to be ground. This mechanism comprises a cylinder 65 which is arranged in axial alignment with the feed screw 40. The cylinder 65 contains a slidably mounted piston 66 which is connected to the right hand end of a piston rod 67. The left hand end of the piston rod is connected to the slidably mounted sleeve 43.

A feed control valve 70 is provided for controlling the admission to and exhaust of fluid from the cylinder 65. The valve 70 is a piston type valve having a slidably mounted valve member 71 having a plurality of spaced valve pistons forming a plurality of spaced valve chambers 72, 73, and 74. The slidably mounted valve member is also provided with a central passage 75 which interconnects the valve chamber 72 with the valve chamber 74. A compression spring 76 serves normally to hold the valve member 71 in a right hand end position.

When fluid under pressure is passed through a pipe 77 into the valve chamber 73, it passes through a pipe 78 and through a port 78a into a cylinder chamber 82 formed at the left hand end of the cylinder 65. Fluid under pressure also passes through a ball check valve 79 and a throttle valve 80 and through a port 81 into the cylinder chamber 82 to cause the piston 66 to move toward the right into a rearward or inoperative position. During this movement of the piston, fluid within a cylinder chamber 83, formed at the right hand end of the cylinder 65 passes through a pipe 84 into the valve chamber 72, through the central passage 75, into the valve chamber 74 and exhausts through a pipe 85.

A dash pot piston 86 is provided to facilitate cushioning the movement of the piston 66 toward the right. When the piston 66 approaches a right hand end position, the right hand end of the piston rod 67 engages and moves the dash pot piston 86 toward the right thereby exhausting fluid from the dash pot chamber 87 through a throttle valve 88 into the pipe 84. By manipulation of the throttle valve 88, the extent of cushioning may be varied as desired. A ball check valve 89 is provided so that when fluid under pressure is passed through the pipe 84 it may pass through the ball check valve 89 and into the dash pot chamber 87 to fill the dash pot chamber for the next cushioning movement.

When it is desired to cause a rapid approaching movement of the wheel slide 25 and the grinding wheel 31, the solenoid S1 is energized to shift the valve member 71 toward the left so that fluid under pressure entering the valve chamber 73 passes through the pipe 84 into the cylinder chamber 83 to cause a rapid movement of the piston 66 toward the left. During the initial rapid movement of the piston 66 toward the right fluid within the cylinder chamber 82 exhausts through the port 78a and through the pipe 78. Fluid may also exhaust through the port 81 and the throttle valve 80 into the pipe 78. As the piston 66 approaches the left hand end of its movement, the piston 66 closes the port 78a so that during the remainder of the movement of the piston 66 fluid within the chamber 82 must exhaust through the port 81 and the throttle valve 80 which serves to slow down the rapid approaching movement.

A fluid pressure system is provided for supplying fluid under pressure to the various actuating mechanisms of the machine. This system comprises a motor driven fluid pump 90 which may be started and stopped by actuation of a switch SW7. The pump 90 draws fluid through a pipe 91 from a reservoir 92 and passes fluid under pressure through the pressure pipe 77. A relief valve 93 is connected to the pipe 77 to facilitate exhausting excess fluid of pressure from the pipe 77 directly to the reservoir 92 to facilitate maintaining a substantially constant operating pressure within the system.

A fluid pressure operated mechanism is provided for imparting a slow rotary motion to the feed screw 40 to control the infeeding movement of the grinding wheels 31, 32, 33 and 34 so that they advance at a predetermined rate during the grinding operation. This mechanism comprises a feed cylinder 95 (Fig. 8) which contains a slidably mounted piston 96. The piston 96 is provided with rack teeth on its upper surface which mesh with a gear 98 mounted on a rotatable shaft 99. The shaft 99 is also provided with a gear 100 which meshes with the gear 54 so that when the piston 96 is moved axially with the cylinder 95 a rotary motion will be imparted to the feed screw 40. When it is desired to cause an infeeding movement, fluid under pressure is passed through a pipe 101 into a cylinder chamber 102 formed at the left hand end of the cylinder 95. During the infeeding movement fluid within a cylinder chamber 103 exhausts through a pipe 104.

Figure 8:
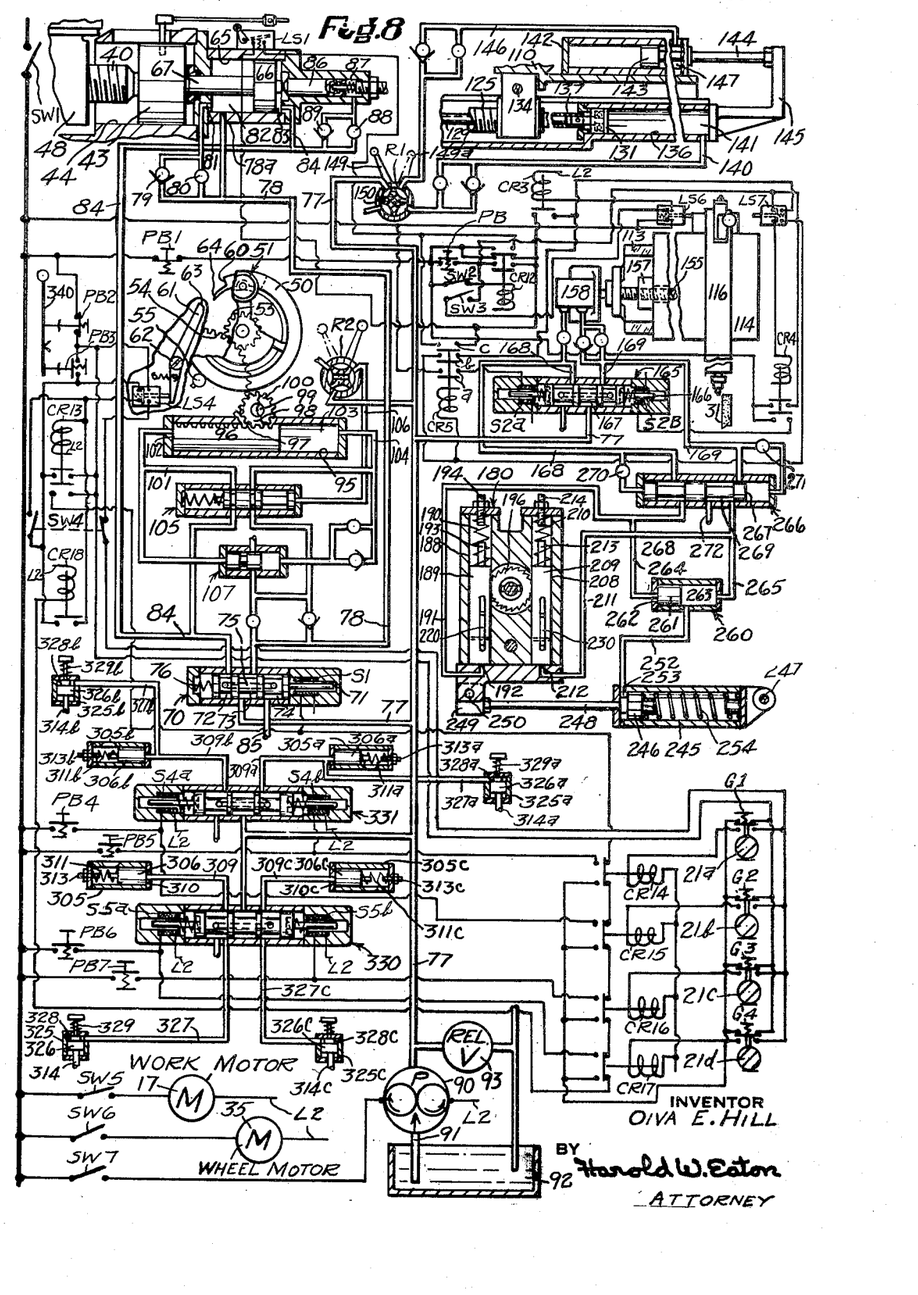
Fig. 8 is a combined electric and hydraulic diagram of the actuating mechanisms and the controls therefor.

A by-pass valve 105 is provided which is arranged in the position shown in Figure 8 to control the passage of fluid from the feed control valve 70 to the opposite ends of the feed cylinder 95. If it is desired to render the feed cylinder 95 inoperative to facilitate a manual operation of the feeding mechanism, the rotary type valve R2 may be shifted in a counter clockwise direction to pass fluid under pressure from the pipe 77 through a pipe 106 to move the by-pass valve 105 into a left hand end position so that fluid within the cylinder chambers 102 and 103 may by-pass thereby facilitating a manual actuation of the feed wheel 50. A backlash valve 107 is provided to facilitate rapidly taking up the backlash in the feed mechanism parts at the start of the feeding movement in either direction. This feeding mechanism is substantially identical with that disclosed in U. S. Patent No. 2,522,485 to H. A. Silven and C. G. Flygare dated September 12, 1950 to which reference may be had for details of disclosure not contained herein.

Figure 2:
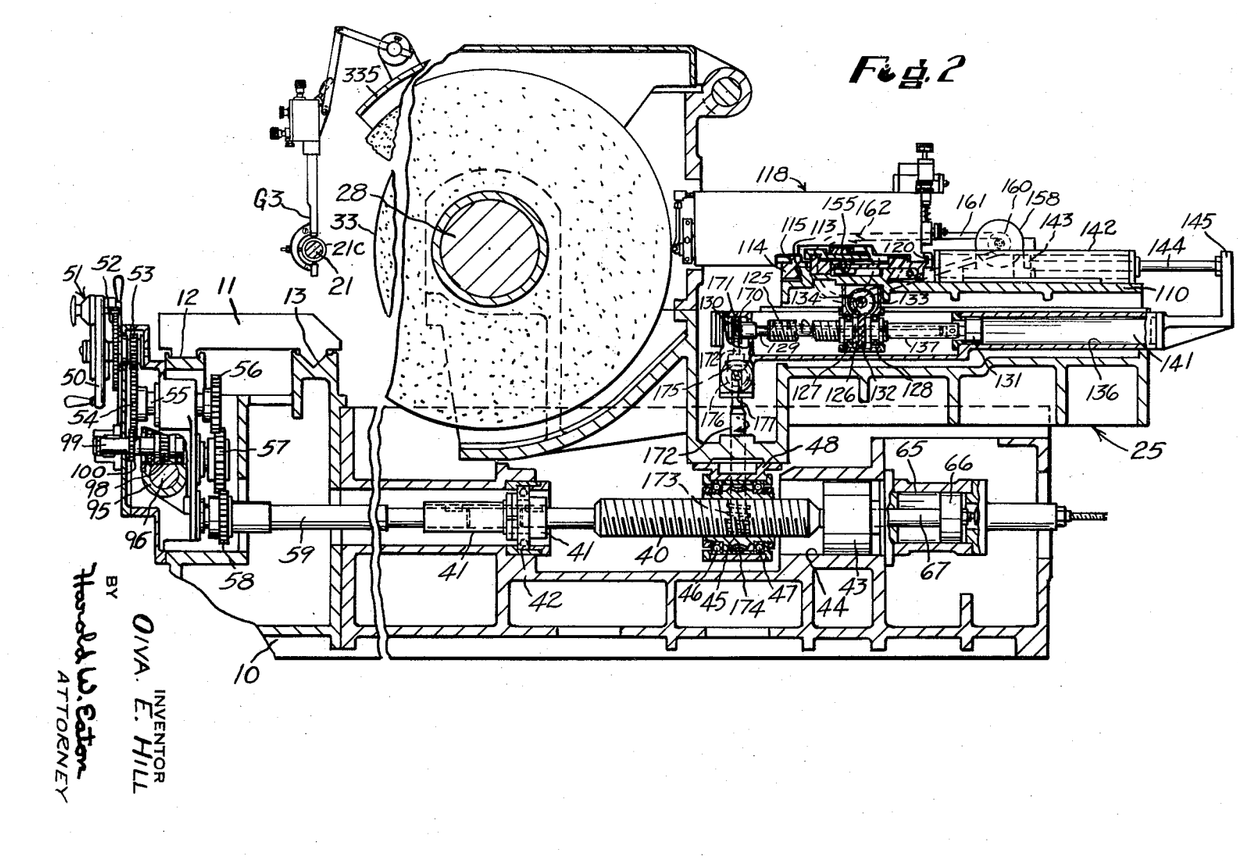
Fig. 2 is a vertical cross sectional view through the machine, showing the wheel feeding mechanism and the grinding wheel truing apparatus in section.
Figures 3, 4:
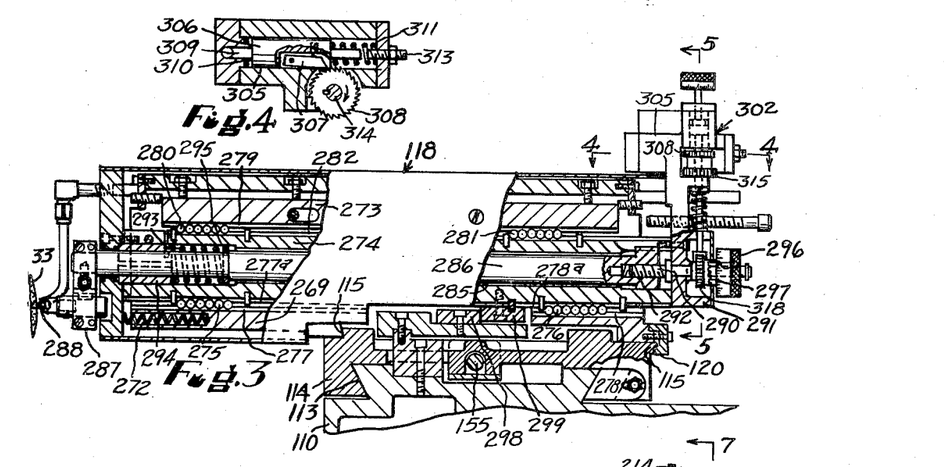
Fig. 3 is a fragmentary vertical sectional view, on an enlarged scale through one of the wheel truing units.
Fig. 4 is a fragmentary horizontal sectional view, on an enlarged scale taken approximately on the line 4—4 of Figure 3.

A multiple wheel truing apparatus is provided whereby all of the grinding wheels 31, 32, 33 and 34 may be simultaneously trued. This mechanism comprises a cross slide 110 (Figs. 1 and 2) which is supported on a flatway 111 and a V-way 112 formed on the upper surface of the wheel slide 25. The cross slide 110 is provided with a longitudinally extending dove-tailed slide-way 113 for guiding a longitudinally traversable slide 114. The slide 114 is provided with a dove-tailed slide-way 115 on which a plurality of truing tool units 116, 117, 118 and 119 may be clamped in spaced adjusted positions thereon. Each of the truing tool units 116, 117, 118 and 119 are provided with a clamping block 120 to facilitate clamping the units in adjusted position on the dove-tailed slide-way 115 (Fig. 3).

A suitable feeding mechanism is provided for adjusting the cross slide 110 toward and from the wheel spindle 28. The mechanism may comprise a feed screw 125 which meshes with or engages a rotatable feed nut 126 journalled in a pair of spaced anti-friction bearings 127 and 128 (Fig. 2). A shaft 129 is slidably keyed within the feed screw 125. The left hand end of the shaft 129 is rotatably supported in an anti-friction bearing 130 at its left hand end which serves to hold the shaft 129 against an axial movement. The right hand end of the feed screw 125 is journalled in anti-friction bearings supported within a piston 131. The nut 126 is provided with a helical gear 132 which meshes with a helical gear 133 which is keyed onto a rotatable shaft 134. The other end of the shaft 134 is provided with a manually operable hand wheel 135, by rotation of the hand wheel 135 a rotary motion may be imparted through the mechanism just described to rotate the feed nut 126 thereby causing a transverse movement of the cross slide 110.

In order to cause a rapid positioning movement of the cross slide 110, a hydraulically operated mechanism is provided comprising the piston 131 which is slidably mounted within a cylinder 136. The cylinder 136 is fixedly mounted relative to the wheel slide 25. The right hand end of the feed screw 125 is formed as a piston rod 137. The feed screw 125 may be moved in an axial direction by the piston 131 or may be rotated in a manner to be hereinafter described for imparting motion to the cross slide 110. When fluid under pressure is passed through a pipe 140 into a cylinder chamber 141, the piston 131 will be moved toward the left (Figures 2 and 8) to impart a corresponding movement to the cross slide 110 so as to move the truing tool units 116, 117, 118 and 119 into an operative position.

In the preferred form an independent hydraulic mechanism is provided for moving the cross slide 110 rearwardly, that is toward the right (Figures 2 and 8) to an inoperative position. This mechanism may comprise a cylinder 142 which is fixedly mounted on the cross slide 110. The cylinder 142 contains a slidably mounted piston 143 which is connected to one end of a piston rod 144. The right hand end of the piston rod 144 is fixedly mounted to a bracket 145 which is in turn fixedly mounted relative to the wheel slide 25. When fluid under pressure is passed through a pipe 146 into a cylinder chamber 147, the piston 143, being anchored, the cylinder 142 moves toward the right to cause a rapid rearward movement of the cross slide 110 to an inoperative position.

A manually operable rotary-type valve R1 is provided for controlling the admission to and exhaust of fluid from the cylinders 136 and 142. The valve R1 is provided with a manually operable lever 149 by means of which a valve rotor 150 may be shifted to reverse the flow of fluid when desired. As illustrated in Figure 8 fluid under pressure from the pipe 77 passes through the valve R1 and through the pipe 146 into the cylinder chamber 147 to move the cross slide 110 into a rearward or inoperative position and to hold it in this position. When it is desired to effect a truing operation, the lever 149 may be rocked from a broken line position 149a in a counter clockwise direction into the full line position 149 (Fig. 8) so that fluid under pressure from the pipe 77 will pass through the pipe 140 to cause a forward movement of the cross slide 110. A power operated mechanism is provided for traversing the truing tool slide 114 longitudinally in either direction. This mechanism comprises a feed screw 155 which is rotatably journalled in a bearing 156 (Fig. 1) fixedly mounted on the cross slide 110. The feed screw 155 meshes with or engages a nut 157 mounted on the left hand end of the slide 114 (Fig. 1). A rotary type fluid motor 158 is provided for actuating the feed screw 155. The motor 158 is mounted on the cross slide 110. The motor 158 is provided with a rotor shaft 159 having a V-groove pulley 160 which is connected by a V-belt 161 with a V-pulley 162 mounted on the left hand end of the feed screw 155. It will be readily apparent from the foregoing disclosure that rotation of the motor shaft 159 will be imparted through the driving mechanism above described to rotate the feed screw 155 and thereby impart a longitudinal traversing movement to the slide 114. As shown diagrammatically in Figure 8, the fluid motor 158 is illustrated as being connected directly to the feed screw 155.

A solenoid-actuated control valve 165 having a slidably mounted valve member 166, is provided for controlling the admission to an exhaust of fluid from the fluid motor 158. The valve member 166 is normally held in a central or neutral position by a pair of spaced compression springs. A pair of solenoids S2A and S2B are provided for shifting the valve member 166 in opposite directions so that fluid under pressure from the pipe 78 entering a valve chamber 167 may pass either through a pipe 168 to one side of the motor 158 to rotate the screw 155 to cause a traversing movement of the slide 114 in one direction, or through a pipe 169 to the motor 158 to impart a rotary motion to the feed screw 155 to traverse the slide 114 in the opposite direction. This traversing mechanism is substantially the same as that disclosed in my prior U. S. Patent No. 2,720,063, dated October 11, 1955, to which reference may be had for details of disclosure not contained herein.

A compensating mechanism is provided to impart a compensating adjustment to the wheel feeding mechanism by an in timed relation with the feeding movement for the cross slide 110. The shaft 129 is provided with a worm gear 170 which meshes with a worm 171. The worm 171 is mounted on the upper end of a vertical shaft 172. The lower end of the shaft 172 is provided with a worm 173 which meshes with a worm gear 174 which is formed integrally with the feed nut 174.

Figures 5, 6, 7:
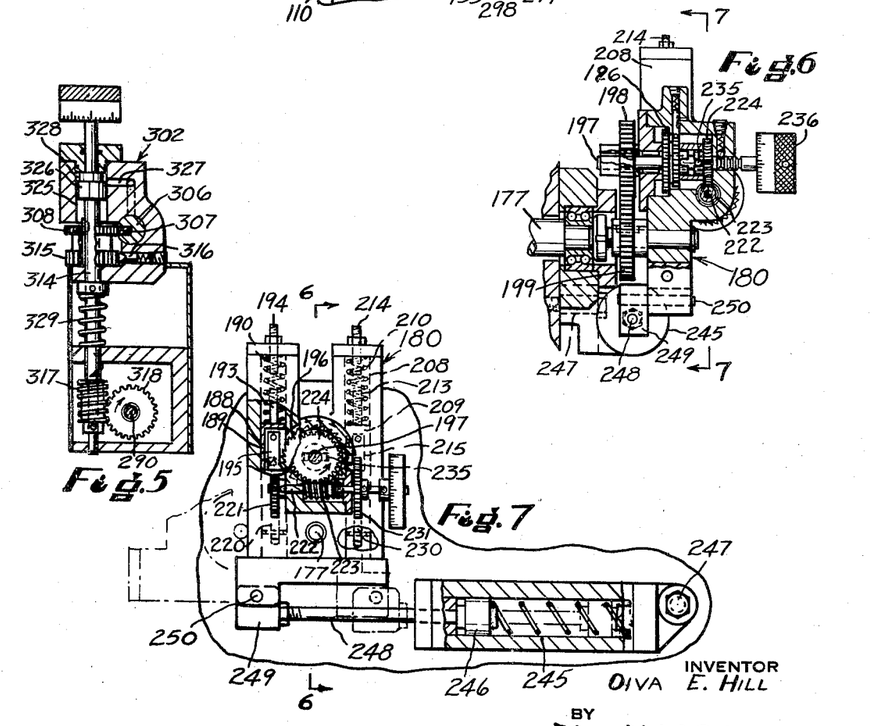
Fig. 5 is a fragmentary vertical sectional view on an enlarged scale, taken approximately on the line 5—5 of Figure 3.
Fig. 6 is a fragmentary vertical sectional view taken approximately on the line 6—6 of Fig. 7.
Fig. 7 is a fragmentary vertical sectional view, taken approximately on the line 7—7 of Figure 6.

The vertical shaft 172 is provided with a bevel gear 175 which meshes with a bevel gear 176 mounted on the end of a horizontally arranged shaft 177. The shaft 177 projects from the side of the machine base and is operatively connected to a feeding and compensating unit 180. The feeding unit 180 comprises a cylinder 188 which contains a slidably mounted piston 189. The piston 189 is normally held in a downward position by a compression spring 190. When fluid under pressure is passed through a pipe 191 into a cylinder chamber 192 formed with the lower end of the cylinder 188, the piston 189 is moved upwardly until an integral stud 193 formed on the upper end of the piston 189 engages an adjustable stop screw 194. The piston 189 is provided with a spring pressed pawl 195 which is arranged to engage the teeth of the ratchet wheel 196 which is fixedly mounted on a rotatable shaft 197. The shaft 197 is provided with a gear 198 which is slidably keyed onto the left hand end thereof (Fig. 6). The gear 198 meshes with a gear 199 keyed on the shaft 177. During the upward movement of the piston 189, the pawl 195 rides idly over the teeth of the ratchet wheel 196. When fluid under pressure is exhausted from the cylinder chamber 192 in a manner to be hereinafter described, the relation of the spring 190 causes a downward movement of the piston 189. During the downward movement of the piston 189, the pawl 195 engaging the teeth of the ratchet wheel 196 imparts a counter-clockwise rotary motion to the ratchet wheel 196 which is submitted through the shaft 197, the gear 198, the gear 199 to rotate the shaft 177 and through the mechanism previously described to impart rotary motion to a feed nut 45 so as to advance the grinding wheel slide 25 and the grinding wheel 31 and to impart a simultaneous rotary motion to the feed screw 125 to advance the cross slide 110 by a predetermined increment before the truing tool starts a longitudinal traversing movement toward the right (Fig. 8).

A second feeding mechanism is provided which is substantially identical with that just described and comprises a cylinder 208 containing a slidably mounted piston 209 which is normally held in a downward position by a compression spring 210. The fluid under pressure is passed through a pipe 211 into a cylinder chamber 212 to cause an upward movement of the piston 209, a spring press pawl 215 engaging the teeth of the ratchet wheel 196 imparts a rotary motion to the ratchet wheel 196 and through the gear mechanism previously described to impart a rotary motion to the feed nut 45 and to the feed screw 125 so as to advance the grinding wheel slide 25 and the grinding wheels 31 and the truing tool slide 110 by a predetermined increment before the truing tool slide 114 starts its traversing movement in the opposite direction. The upward movement of the piston 209 continues until a stud 213 formed integrally with the upper end of the piston 209 engages an adjustable stop screw 214. By manipulating stop screw 194 and 214, the extent of infeeding movement of the grinding wheel before each stroke of the truing tool slide 114 may be independently regulated as desired.

The mechanism just described serves to impart a relatively coarse infeed before each traversing movement of the truing slide 114. If a fine feeding increment is desired before each traversing movement of the truing tool slide 114, another mechanism to be hereinafter described is employed. The piston 189 is provided with a spring press pawl 220 which is arranged to engage the teeth of a ratchet wheel 221 which is fixedly mounted on a rotatable shaft 222 (Figs. 6 and 7). The shaft 222 is provided with a worm 223 which meshes with a worm gear 224 which is rotatably mounted on the shaft 197. The pawl 220 serves during the forward movement of the piston 189 to impart a clockwise rotary motion of the ratchet wheel 221.

The piston 209 is similarly provided with a pawl 230 (Fig. 7) which is arranged to engage the teeth of a ratchet wheel 231 which is also fixedly mounted on the shaft 222. The pawl 230 serves during the toward movement of the piston 209 to impart a feeding increment through the ratchet wheel 231 and the mechanism previously described to the feed nut 45 and to the truing slide feed screw 125.

The ratchet wheel 196 and the worm gear 224 are rotatably mounted on the shaft 197. A clutch mechanism is provided comprising a clutch pin 235 (Fig. 6) which is fixedly mounted on the shaft 197 which may be moved toward the right or toward the left by an actuating knob 236 to lock either the ratchet wheel 196 or the worm gear 224 to the shaft 197. When the worm gear 224 is locked to the shaft 197, as shown in Fig. 6, a relatively fine feeding increment is imparted through either the ratchet wheel 221 or the ratchet wheel 231 to impart a feeding increment to the feed nut 45 and to the truing slide feed screw 125. It will be readily apparent from the foregoing disclosure that either a relatively fine feeding increment may be obtained by each pass of the truing tool across the operative face of the grinding wheels, or a coarse feed may be obtained as desired. When the clutch knob 236 is moved toward the left (Fig. 6), the gear 196 is locked to the shaft 197 so as to render the coarse feeding mechanism operative. When the knob 236 is moved into a right hand end position (Fig. 6), the ratchet wheel 231 is locked to the shaft 197 so that a fine feed may be obtained before each stroke of the truing tool slide 114.

In order to obtain a precise infeeding movement of the grinding wheels 31 at each actuation of the feed mechanism, it is desirable to provide a suitable mechanism automatically to unwind and wind the feed nut 45 and feed screw 125 each time the feed mechanism is actuated to facilitate taking up backlash in the feed mechanism parts. This is preferably accomplished by a hydraulically operated mechanism comprising a cylinder 245 (Figs. 7 and 8) which contains a slidably mounted piston 246. The cylinder 245 is pivotally connected with its right hand end to the base 10 by means of a stud 247. The piston 246 is connected to the right hand end of the piston rod 248. The other end of the piston rod 248 is fixedly connected to a block 249 which is in turn connected by a pivot stud 250 with the feeding unit 180. When fluid under pressure is passed through a pipe 252 into a cylinder chamber 253 formed at the left hand end of the cylinder 245, the piston 246 together with the piston rod 248 are moved toward the right so as to rock the feeding unit 180, in a counterclockwise direction about the axis of the shaft 177 thereby imparting an unwinding movement to the feed nut 45 and to the feed screw 125. During this movement, a compression spring 254 within the cylinder 245 is compressed. When fluid under pressure is free to exhaust from the cylinder chamber 253, the released compression of the spring 254 moves the piston 246 and piston rod 248 toward the left so as to impart a clockwise movement to the feed unit 180, thereby imparting a winding movement to the feed nut 45 and to the feed screw 125.

A control valve 260 is provided to control the admission to an exhaust of fluid from the pipe 252 and the cylinder 245. The valve 260 is a shuttle-type of valve having a slidably mounted valve member 261. The valve 260 is provided with end chambers 262 and 263. When fluid under pressure is passed through a pipe 265 into the chamber 263 to move the valve member 261 toward the left, fluid under pressure may pass from the chamber 263, through the pipe 252 into the cylinder chamber 253 thereby moving the piston 261 toward the right (Fig. 8) to impart a counter-clockwise movement to the compensating unit 180 so as to impart an unwinding movement to the feed nut 45 and to the feed screw 125. When fluid is free to exhaust from the cylinder chamber 253, the released compression of a spring 254 serves to move the piston 246 into a left hand end position thereby rocking the compensating unit 180 in a clockwise direction so as to impart a wind movement to the feed nut 45 and to the feed screw 125.

A shuttle-type control valve 266 is provided to control the admission to and exhaust of fluid from the compensating cylinder chambers 192 and 212, and also to the opposite ends of the valve 260. The valve 266 is provided with a slidable valve member 267 having a plurality of spaced integral pistons forming a pair of spaced valve chambers 268 and 269. The pipes 168 and 169 are operatively connected between the control valve 165 and the opposite ends of the valve 266. When the valve 165 is actuated by energization of either the solenoid S2a or S2b to start a longitudinal traversing movement of the truing tool slide 114, the valve 266 is actuated to impart a compensating adjustment to the feed nut 45 and to the feed screw 125 and simultaneously to impart an unwind and a wind movement to the feed nut 45 and to the feed screw 125.

As above explained the truing tool units 116, 117, 118, and 119 are each formed with dovetailed slide surfaces which mate dovetailed slide surfaces 115 formed on the longitudinally movable slide 114. This arrangement facilitates setting up the machine and provides means for positioning the units along slide 114 to correspond with the spacing of the grinding wheels 31, 32, 33, and 34 respectively. Each of the truing tool units 116, 117, 118, and 119 are identical in construction, consequently only the truing unit 118 has been illustrated and will be described in detail. The truing unit 118 (Fig. 3) is provided with a frame 269 which serves as a support for a truing tool slide 274. The truing tool slide 274 is supported by a pair of spaced rows of balls 275 and 276 which ride within V-shaped grooves 277 and 278 formed on the frame 269. The truing tool slide 274 is provided with a correspondingly shaped V-grooves 277a and 278a which serves as a support for the truing tool slide 274. The frame 269 is provided with an adjustable gib 273, having a V-groove 279 which engages a pair of spaced rows of balls 280 and 281. The balls 280 and 281 roll within a V-shaped groove 282 in the upper surface of the truing tool slide 274. Suitable adjusting screws are provided to facilitate adjustment of the gib 273 relative to the frame 269 to take-up lost motion in the slide parts.

The slide 274 is provided with a central aperture 285 which contains a truing tool supporting rod or member 286. A bracket 287 is mounted on the left hand end of the rod 286. The bracket 287 serves to support a truing tool 288 in operative position relative to the grinding wheel 34.

A nut and screw adjusting mechanism is provided for adjusting or feeding the truing tool supporting rod 286 relative to the slide 274 (Fig. 3). This mechanism comprises a feed screw 290 which is rotatably supported by an end cap 291 fastened to the right hand end of the slide 274. The feed screw 290 meshes or engages a nut 292 formed integral with the truing tool supporting rod 286. A compression spring 293 surrounds a portion of the truing tool supporting rod 286 and is interposed between a bushing 294, which is fixed relative to the slide 274 and a thrust collar 295 surrounding a portion of the rod 286. The compression spring 293 serves to take up backlash between the feed screw 290 and the feed nut 292.

A manually operable knob 296 is slidably keyed to the right hand end of the feed screw 290. If it is desired to manually adjust the position of the truing tool 288 in setting up the machine, the knob 286 moved toward the right to disengage a clutch 297 after which a manual rotation of the knob 296 will impart a rotary motion to the feed screw 290 to produce a longitudinal adjustment to the rod 286 and the truing tool 288 relative to the slide 274.

A forming bar 298 is mounted on the upper surface of the cross slide 110. Each of the truing tool units 116, 117, 118, and 119 are provided with followers 299. Each of the truing tool units 116, 117, 118, and 119 are provided with a compression spring 272 only one of which has been illustrated in Fig. 3, to facilitate maintaining the followers 299 in operative engagement with the forming bar 298 during a longitudinal traversing movement of the slide 114. As illustrated, the forming bar 298 is a straight bar having a plane operative surface for truing true cylindrical surfaces on the grinding wheels 31, 32, 33, and 34. If it is desired to true shaped or irregular surfaces on the grinding wheels, a forming bar of the desired shape may be provided.

A plurality of feed compensating units 300, 301, 302, and 303 are provided on the truing tool units 116, 117, 118, and 119, respectively, for imparting an independent compensating adjustment to each of the truing tool feed screws 290 and simultaneously to impart an unwind and a wind motion to the feed screws. These compensating units 300, 301, 302, and 303 are identical in construction, consequently only the unit 302 has been illustrated in detail in Figs. 3, 4, and 5.

The truing tool compensating unit 302 comprises a cylinder 305 which contains a slidably mounted piston 306. The piston 306 is provided with a spring pressed pawl 307 which is arranged to engage the teeth of a ratchet wheel 308. When fluid under pressure is passed through a pipe or passage 309 into a cylinder chamber 310, the piston 306 is moved toward the right (Fig. 4) against the compression of a spring 311. During this movement, the pawl 307 imparts a clockwise rotary motion to the ratchet wheel 308. The extent of movement of the piston 306 is limited by an adjustable stop screw 313.

The ratchet wheel 308 is keyed on a vertical shaft 314 (Fig. 5). A serrated wheel 315 which is formed integral with the ratchet wheel 308 is engaged by a spring pressed detent 316 so as to hold the ratchet wheel 308 and the shaft 314 against counter-clockwise movement (Fig. 4) during the idle stroke of the piston 306 toward the left. A worm 317 is fixedly mounted on the lower end of the shaft 314. The worm 317 meshes with a worm gear 318 which is rotatably supported on the right hand end of the feed screw 290 (Fig. 3). The worm gear 318 is normally held fixed to the feed screw 290 and a knob 296 by means of a clutch 297.

The compensator unit 302 may be rendered inoperative when desired to facilitate a manual adjustment of the feed screw 290 in setting-up the machine. The knob 296 is moved toward the right (Fig. 3) so as to disengage the clutch 297 after which the knob 296 may be manually rotated to adjust the position of the truing tool 288 relative to the slide 274.

It is desirable to impart an unwind and a wind motion to the feed screw 290 simultaneously with each actuation of the compensator unit 302 to facilitate taking up backlash in the feed mechanism parts so as to facilitate a precise fine feeding adjustment of the truing tool 288 relative to the slide 274. The compensator unit 302 is provided with a cylinder 325 (Figs. 3, 5, and 8) which contains a slidably mounted piston 326. The piston 326 is fixedly mounted on the shaft 314. A compression spring 329 surrounding the shaft 314 serves normally to hold the shaft 314 and the piston 326 in an uppermost position. When fluid under pressure is passed through a pipe or passage 327 into a cylinder chamber 328, the piston 326 together with the shaft 314 and the worm 317 are moved downwardly. During this movement, the worm 317 moving in an axial direction imparts a counterclockwise rotary motion to the worm gear 318 so as to impart an unwind motion to the feed screw 290. When fluid in the cylinder chamber 328 is free to exhaust, the released compression of the spring 329 serves to cause an upward movement of the shaft 314 and the piston 326. During this movement, the worm 317 imparts a clockwise rotary motion to the worm gear 318 so as to impart a wind movement to the feed screw 290. The above described unwind and wind movement of the feed screw 290 is rapid movement and take place simultaneously with the actuation of the truing tool feed compensation.

Each of the truing tool compensator units 300, 301, 303 are identical to the unit 302, just described, consequently they will not be described in detail. The actuating mechanism for feed compensation and unwind and wind mechanisms of units 300, 301, and 302 have been illustrated diagrammatically in Fig. 8 in which corresponding parts have been designated by the same reference numerals with the suffix "a," "b," and "c." A solenoid-actuated control valve 330 (Fig. 8) is normally held in a central position and is actuated either toward the right or toward the left by a pair of solenoids S5a and S5b. When the solenoid S5a is energized, the valve 330 is shifted toward the right to pass fluid under pressure through the pipes 309 and 327 to the compensating cylinder 305 and the unwind and wind cylinder 325 of the unit 302 simultaneously to impart a compensating feed to the truing tool 288 (Figs. 1 and 3) and an unwind and a wind motion to the feed screw 290. Similarly when the solenoid S5b is energized, the valve 330 is shifted toward the left to pass fluid under pressure through the pipes 309c and 327c to the compensating cylinder 305c and the unwind-wind cylinder 325c of the unit 301 simultaneously to impart a compensating feed to the truing tool 288c (Fig. 1) and an unwind and wind motion to the feed screw (not shown) of the unit 301.

A solenoid-actuated control valve 331 (Fig. 8) is normally held in a central position and is actuated either toward the right or toward the left by a pair of solenoids S4a and S4b. When the solenoid S4a is energized, the valve 331 is shifted toward the right to pass fluid under pressure through the pipe 309b to the compensating cylinder 305b and the unwind-wind cylinder 325b of the unit 300 simultaneously to impart a compensating feed to the truing tool 288b (Fig. 1) and an unwind-wind motion to the feed screw (not shown) of the unit 300. Similarly when the solenoid S4b is energized the valve 331 is shifted toward the left to pass fluid under pressure through the pipe 309a to the compensating cylinder 305a and the unwind-wind cylinder 325a of the unit 303 simultaneously to impart a compensating feed to the truing tool 288a (Fig. 1) and an unwind-wind motion to the feed screw (not shown) of the unit 303.

A plurality of spaced electric work gauges G1, G2, G3, and G4 are provided for engaging the portions 21a, 21b, 21c, and 21d of the work piece 21 to be ground. The gauges G1, G2, G3, and G4 are pivotally supported on a grinding wheel guard 335, as indicated in Figs. 1 and 2, and are arranged so that they may be driven independently into or out of engagement with the portions of the work piece to be ground before and after grinding. To electric work gauges may be any of the old and well known gauges, such as for example that shown in the United States Patent No. 2,267,559 to S. A. Foster dated December 23, 1941, to which reference may be had for details of disclosure not contained herein. As illustrated diagrammatically in Fig. 8, the gauges G1, G2, G3, and G4 are arranged to control energization of a plurality of relay switches CR14, CR15, CR16 and CR17 respectively.

The operation of the improved grinding machine will be readily apparent from the foregoing disclosure. A work piece 21 having a plurality of spaced portions 21a, 21b, 21c, and 21d, to be ground is loaded onto the work supporting centers 18 and 20 and the electric gauges G1, G2, G3, and G4 are swung into operative engagement with the portions to be ground. This serves to close the normally open contacts of the gauges.

The main switch SW1 is then closed to close a circuit through switches PB1 and SW2 to energize the relay switch CR12. The switch SW5 is then closed to start the work drive motor 17. The switch SW6 is then closed to start the wheel drive motor 35. The switch SW7 is closed to start the motor driven fluid pump 90 to supply fluid under pressure to the pressure pipe 77 thereby pass fluid under pressure through the feed control valve 70 to the cylinder chamber 103 in the right hand end of the wheel feed cylinder 95, and to the left hand cylinder chamber 82 in the rapid approach cylinder 65 so as to hold the wheel slide 25 and the grinding wheels 31, 32, 33, and 34 in a rearward or inoperative position. Fluid under pressure also passes through the rotary valve 148 into the cylinder chamber 141 to hold the cross slide 110 of the wheel truing apparatus in a forward or operative position.

When it is desired to start a grinding cycle, the cycle control lever 340 (Fig. 8) is rocked in a counter-clockwise direction to close a cycle start switch PB3. Closing of switch PB3 serves through normally open, now held closed contacts of the limit switch LS4 to energize a relay switch CR13. The closing of the contacts of relay switch CR13 serves to energize the solenoid S1 to shift valve member 71 toward the left so that fluid under pressure is passed to cylinder chamber 83 to initiate a rapid approaching movement of the wheel slide 25, and also to the cylinder chamber 102 to initiate a grinding feed. The closing of the contacts of relay switch CR13 serves through the normally closed contacts of the relay switches CR14, CR15, CR16, and CR17 to set-up a holding circuit to maintain solenoid S1 energized after the normally open, held closed contacts of limit switch LS4 open.

As the piston 96 moves toward the right (Fig. 8) to impart a rotary feeding motion to the feed screw 40, the feed wheel 50 rotates in a counter-clockwise direction. During this movement, a cam surface 64 engages and rocks the pawl 61 in a counter-clockwise direction thereby allowing the normally closed contacts of the limit switch LS4 to close, and the normally open contacts to open. The closing of the normally closed contacts of LS4 connects power to all the normally closed, now open, contacts of the electric gauges G1, G2, G3, and G4. Grinding continues until the normally closed contacts, now held open, of one of gauges G1, G2, G3, or G4 close thereby closing a circuit to energize one of the relay switches CR14, CR15, CR16, or CR17. The normally closed contacts of one of these relays open and the normally open contacts close energizing one of the four solenoids S4a, S4b, S5a, or S5b so as to pass fluid under pressure to the corresponding cylinder 305, 305c, 305b, or 305a to advance the corresponding truing tool 288, 288c, 288b, or 288a, by a predetermined increment. Fluid under pressure is passed simultaneously to the corresponding cylinder 325, 325c, 325b, or 325a to impart an unwind and a wind movement to the truing tool feed screw 290. This compensating adjustment of the truing tool serves to advance the truing tool so that on the next grinding wheel truing operation a greater amount will be trued off the corresponding grinding wheel so as to compensate and equalize, the sizing on each portion of the work piece.

The energizing of anyone of the relay switches CR14, CR15, CR16, or CR17 serves to break the holding circuit to deenergize the relay switch CR18 thereby deenergizing the solenoid S1. When solenoid S1 is deenergized, the release compression of the spring 76 shifted valve 70 into a right hand end position so as to pass fluid under pressure to cylinder chamber 103 to move piston 96 toward the left so as to turn feed wheel 50 in a clockwise direction to reset the feed mechanism, and at the same time to pass fluid under pressure into cylinder chamber 82 to move the piston 66 toward the right (Fig. 8) to move the wheel slide 25 together with the grinding wheels 31, 32, 33, and 34 to a rearward or inoperative position. The gauges G1, G2, G3, and G4 are then swung out of operative engagement with the ground work piece 21. When the gauges are out of engagement with the work, the normal open contacts thereof open and the normally close contacts close thereby deenergizing one of the solenoids S5a, S5b, S4a or S4b to allow the valve 330 or the valve 331 to return to a central or neutral position. This serves to release the compression of the springs so that one of the compensating pistons 306, 306c, 306b, or 306a to return to initial position and at the same time returns one of the pistons 326, 326b, 326c, or 326a to initial position thereby imparting a wind movement to one of the truing tool feed screws 290.

The solenoids S5a, S5b, S4a or S4b may be manual energized by actuation of the push button switches PB6, PB7, PB4, or PB5, respectively, to facilitate a manual incremental feed of the truing tools 288, 288c, 288b, or 288a. This manual adjustment is useful in setting-up the machine.

If one or more portions of the work piece are ground to the predetermined size before the other portions, this indicates that the grinding wheel or wheels grinding those portions are of too great a diameter, consequently the electric gauge imparts a compensating feed to the truing tools so that on the next truing operation a greater amount will be trued off the particular grinding wheel or wheels. In case all of the portion of the work piece 21 being ground simultaneously reach predetermined size, then no compensation is required.

The truing apparatus is arranged automatically to true the grinding wheels after each work piece has been ground. During the rearward movement of the wheel slide 25, a limit switch LS1 is momentarily closed. This serves through normally open contacts, now closed of the previously energized relay switch CR12, through the normally closed (now closed) contacts of a limit switch LS7 to energize a relay switch CR4. The closing of the normally open contacts of the relay switch CR4 sets up a holding circuit through the normally closed contacts of the limit switch LS7 to hold relay switch CR4 energized. The closing of another set of normally open contacts of CR4 serves to energize the solenoid S2b. The energizing of solenoid S2b shifts the valve member 166 of the valve 165 toward the left to pass fluid under pressure to one side of the fluid motor 158 to start a traversing movement of the truing tool slide 114 toward the right so that the truing tools 288a, 288b, 288c, and 288 simultaneously true the operative faces of the grinding wheels 31, 32, 33, and 34 respectively. At the same time the solenoid S2b is energized, fluid under pressure shifts valve 266 toward the right to actuate the feed compensator piston 189 simultaneously to advance the wheel slide 25 and the truing apparatus cross slide 110 by an amount to be trued off the grinding wheel. At the same time fluid under pressure is passed from the valve 266 to the cylinder 245 to impart an unwind and a wind movement to the feed nut 45. The feed compensation and unwind-wind movements take place before the truing tools traverse into engagement with the grinding wheels.

When the truing slide 114 starts moving toward the right, the normally open contacts of the limit switch LS6 open and the normally closed contacts close to energize the relay switch CR3 so that it is made ready for the return stroke of the truing tool slide 114. When the slide 114 reaches the right hand end of its stroke, the limit switch LS7 is actuated. The normally closed contacts of limit switch LS7 open thereby deenergizing the relay switch CR4. The deenergizing of relay switch CR4 serves to deenergize the solenoid S2b which allows valve 165 to return to a center position thereby stopping the slide 114.

A single pass of the truing tools takes place automatically after each grinding operation so as to present a freshly trued operative face of the grinding wheels for the next grinding operation. The infeed of the truing tools prior to each truing is minute. Simultaneous with the infeed of the truing tool, the grinding wheel slide is advanced by a corresponding increment and a simultaneous unwind and a wind motion is imparted to the nut and screw feeding mechanisms of both the wheel slide and the truing apparatus cross slide. During the truing operation, the gauges are moved to inoperative positions and the ground work piece 21 is removed from the machine and replaced with a new work piece 21 to be ground.

After a new work piece is positioned in the machine, the gauges G1, G2, G3, and G4 are swung into operative engagement with the new work piece 21.

The cycle control lever 340 is again actuated to start a grinding cycle. If the truing operation has not been completed, the traverse of slide 114 continues during the initial grinding on the next work piece. The grinding cycle continues on the second work piece in the same manner as above described. After the second work piece has been ground to a predetermined size, the solenoid S1 is deenergized to cause a rearward movement of the wheel slide 25 and a resetting of the feed mechanism, as previously described.

During the rearward movement of the wheel slide 25, the limit switch LS1 is momentarily closed to energize a relay switch CR5 through the now closed contacts of relay switch CR3, which was energized by the normally closed now closed contacts of limit switch LS6, and through the normal open now closed contacts of LS7. The closing of one set of normally open contacts "a" of relay switch CR5 energizes the solenoid S2a to shift the valve member 166 toward the right to start the fluid motor 158 in the opposite direction so as to traverse the truing tool slide 114 toward the left to true the grinding wheels 31, 32, 33, and 34. The closing of another set of contacts "b" of relay switch CR5 sets up a holding circuit to maintain relay switch CR5 energized, and the closing of a third set of contacts "c" of relay switch CR5 serve through the now closed contacts of relay switch CR3 to maintain this hold circuit after the limit switch LS1 opens.

The energizing of the solenoid S2a and the shifting of the valve member 166 toward the right so that fluid under pressure is passed momentarily through the valve chamber 269 of the valve, through the pipe 211 to actuate the piston 209 of the compensator 180 to impart a compensating feed to the wheel slide 25 and the truing tool slide 110 by an amount to be trued off the grinding wheels. Fluid under pressure also passes from the valve chamber 269, through the pipe 265 to shift the valve member 261 toward the left to pass fluid under pressure through the pipe 252 to move the piston 246 toward the right thereby rocking the compensator unit 180 in a counter-clockwise direction to impart an unwind and a wind movement to the feed nut 45 and to the feed screw 125. Fluid under pressure passing through the pipe 169 also passes through the throttle valve 271 to shift the valve member 267 toward the left so that fluid may exhaust from the cylinder 212 through the valve chamber 269 and through an exhaust pipe 272 so as to allow the piston 209 to move downwardly into its initial position. Fluid is also free to exhaust from the cylinder chamber 253 under the influence of the released compression of the spring 254 thereby moving the piston 246 toward the left to rock the compensator unit 180 in a clockwise direction so as to impart a wind motion to the feed nut 45.

As the truing slide 114 moves toward the left the normally open contacts of the limit switch LS7 open and the normally closed contacts close. When the slide 114 reaches the left hand end of its travel, the normally closed contacts of the limit switch LS6 open to deenergize the relay switch CR3. The deenergizing of relay switch CR3 serves to deenergize the relay switch CR5 and thereby to deenergize the solenoid S2a to allow the valve member 166 to return to a central or neutral position.

The above described cycle repeats, after each work piece has been ground, the grinding wheels are trued automatically by a single pass of the truing tools across the operative faces of the grinding wheels. Before each truing operation, a compensating feed automatically advances both the grinding wheels and the truing tools and an automatic unwind and wind movement is imparted to the feed nut 25 and to the screws 125 and 290.

It will be readily apparent from the foregoing disclosure that a portion of the work piece cannot be ground undersize. If all of the work portions simultaneously reach a predetermined size, the gauges G1, G2, G3, and G4 operate to break the circuit to deenergize the solenoid S1 so that the wheel slide moves to a rearward or inoperative position. During this movement, the limit switch LS1 is momentarily closed to initiate a traversing movement of the truing tools. Before the truing tools move into engagement with the grinding wheels, a compensating feed increment is imparted to the truing tool cross slide and the wheel slide.

If one or more of the portions, but not all portions, simultaneously reach a predetermined size, this indicates that the remaining portion or portions are oversize. In this case, the gauges on the portions reaching predetermined size impart a compensating advance to the corresponding truing tools so that truing tools take a greater amount off the corresponding grinding wheel on the next truing operation. Thus on the next grinding operation all work portions will be ground to predetermined size.

If desired, a continuously truing operation may be obtained in which case the truing tools are reciprocated continuously during grinding. A minute compensating feed is imparted automatically to both the grinding wheel slide 25 and the truing apparatus cross slide 110, together with an unwind and wind movement of the feed nut 45 and to the fed screw 125 before each traversing movement of the truing tool slide 114 in either direction. For a continuous truing operation, a switch SW3 is closed so that when the slide 114 traverses into a lefthand end position, it closes the normally open contacts of the limit switch LS6 and thereby starts the slide 114 traversing toward the left.

The truing apparatus may be operated manually, if desired. The switches SW2 and SW3 are opened. The switch PB is momentarily closed to initiate a manual truing operation and the truing tools make one complete reciprocation across the operative faces of the grinding wheels.

The wheel slide 25 may be operated manually, without the use of the electric gauges G1, G2, G3, and G4. The switch SW4 is shifted toward the left after which the cycle control lever 340 may be actuated in a counter-clockwise direction to actuate the switch PB3 to cause a forward movement of the wheel slide 25, or in a clockwise direction to actuate the switch PB2 to cause a rearward movement of the wheel slide 25.

A manually operable rotary valve R1 is provided to facilitate moving the truing apparatus cross slide 110 to and from an operative position. A manually operable rotary valve R2 is provided to actuate the by-pass valve 105 toward the left (Fig. 8) into a by-pass position to facilitate manual actuation of the feed wheel 50 in setting-up the machine.

It will thus be seen that there has been provided by this invention apparatus in which the various objects hereinabove set forth together with many thoroughly practical advantages are successfully achieved. As many possible embodiments maybe made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a grinding machine for grinding a plurality of spaced portions on a work piece having a base, a transversely movable wheel slide thereon, a plurality of spaced rotatable grinding wheels on said slide, a wheel feeding mechanism to feed said slide transversely toward and from the work piece simultaneously to grind a plurality of spaced portions thereon to a predetermined size, a truing apparatus on said wheel slide including a longitudinally movable carriage, a plurality of longitudinally adjustable truing tool units on said carriage, means to traverse said carriage longitudinally in either direction to traverse the truing tools relative to the grinding wheels a truing tool carrier slidably mounted on each of said units, a truing tool on each of said carriers, means including a feeding mechanism to move said carriage transversely in a direction normal to the axis of the grinding wheel simultaneously to adjust all of the truing tools relative to the wheel axis, and means actuated by an intimed relation with the movement of the wheel slide to an inoperative position to initiate a longitudinal traversing movement to said carriage to traverse the truing tools across the operative faces of the grinding wheels, and means to advance the truing tool carriage transversely by a minute increment and simultaneously to advance the grinding wheel by a similar increment before the truing tools move into engagement with the grinding wheels and simultaneously to impart an unwind and a wind movement to the truing tool feeding and the wheel slide feeding mechanisms to take-up the feed increment before the truing tools engage the grinding wheels.

2. In a grinding machine for grinding a plurality of spaced portions on a work piece having a base, a transversely movable wheel slide thereon, a plurality of spaced rotatable grinding wheels on said slide, a wheel feeding mechanism to feed said slide transversely toward and from the work piece simultaneously to grind a plurality of spaced portions thereon to a predetermined size, a truing apparatus on said wheel slide including a cross slide movable in a direction normal to the axis of the grinding wheels, means to move said slide in either direction, a longitudinally movable carriage on said cross slide movable in a direction normal to said cross slide, means to transverse said carriage longitudinally in either direction parallel to the axis of the grinding wheels, a plurality of longitudinally adjustable truing tool units on said carriage a slidably movable cross slide on each of said carriers arranged in a direction normal to the axis of the grinding wheel, a truing tool on each of said carriers, a cross feeding mechanism for moving said cross slide in either direction simultaneously to advance all of the truing tool units for a truing operation, and means actuated by an in timed relation with movement of the wheel slide to an inoperative position to initiate a longitudinal traversing movement to said carriage to traverse the truing tools across the operative faces of said grinding wheels, and means to advance the truing tool cross slide by a minute increment and to simultaneously advance the grinding wheel by a similar increment before the truing tools move into engagement with the grinding wheels and simultaneously to impart an unwind and a wind movement to the cross slide and the same slide feeding mechanism to take up the feed increment before the truing tools engage the grinding wheels.

3. In a grinding machine for grinding a plurality of spaced portions on a work piece having a base, a transversely movable wheel slide thereon, a plurality of spaced rotatable grinding wheels on said slide, a wheel slide feeding means to feed said slide transversely in a direction transverse to the axis of the grinding wheel simultaneously to grind a plurality of spaced portions on a work piece to a predetermined size, and a truing apparatus on said wheel slide including a cross slide movable in a direction normal to the axis of the grinding wheels, means to move said cross slide in either direction, a longitudinally movable carriage on said cross slide movable in a direction normal to said cross slide, means to traverse said carriage longitudinally in either direction parallel to the axis of the grinding wheels, a plurality of longitudinally adjustable truing tool units on said carriage, a slidably mounted truing tool carrier on each of said units arranged to move in a direction normal to the axis of the grinding wheel, a truing tool on each of said carriers, a cross slide feeding means to move said cross slide in either direction simultaneously to advance all of the truing tool units, independent compensating feed mechanism on each of said units which is interposed between the longitudinally movable carriage and each of the carriers operatively connected independently to adjust each of said carriers relative to the longitudinally movable carriage, and an independent work gauge for each portion of the work piece to be ground, said gauges being operatively connected automatically to separate the grinding wheel and work when one or more work portions are ground to a predetermined size and simultaneously to actuate said compensating feed mechanism to impart an independent compensating adjustment to one or more of the truing tools if one or more work portions but not all are ground over a predetermined size.

4. In a grinding machine, as claimed in claim 1, of an independent compensating mechanism on each of the truing tool units which are interposed between the longitudinally movable carriage and each of the carriers which are operatively connected independently to adjust each of the carriers relative to the longitudinally movable carriage, and an independent work gauge for each portion of the work piece to be ground said gauges operatively connected automatically to separate the grinding wheel and the work when one or more portions of the work piece are ground to a predetermined size and simultaneously to actuate said compensating feed mechanism to impart a compensating adjustment to one or more of the truing tools if one or more of the work portions but not all are ground over size.

5. In a grinding machine, as claimed in claim 1 of an independent compensating mechanism on each of the truing tool units including a nut and screw mechanism interposed between a longitudinally movable carriage and each of the carriers operatively connected independently to adjust each of said carriers relative to the longitudinally movable carriage, and an independent work gauge for each portion of the work piece to be ground, said gauges being operatively connected automatically to separate the grinding wheel and the work when one or more work portions are ground to a predetermined size and simultaneously to actuate said nut and screw mechanism to impart an independent compensating adjustment to one or more of the truing tools if one or more of the work portions but not all are ground over size.

6. In a grinding machine, as claimed in claim 1, of an independent compensating mechanism for each of the truing tool units including a nut and screw mechanism which is interposed between the longitudinally movable carriage and each of the carriers operatively connected independently to adjust each of the carriers relative to the longitudinally movable carriage, an independent work gauge for each portion of the work piece to be ground, said gauges being operatively connected automatically to separate the grinding wheel and the work piece when one or more work portions are ground to a predetermined size and simultaneously to actuate said nut and screw mechanism to impart an independent compensating adjustment to one or more of the truing tools if one or more work portions but not all are ground over size and an independent means to adjust the extent of said compensating adjustment.

7. In a grinding machine, as claimed in claim 1, in which the grinding wheel truing apparatus includes an independent nut and screw compensating mechanism on each of the truing tool units, an independent piston and cylinder operatively connected to actuate each of said nut and screw mechanism to impart an compensating adjustment to each of said truing tools, a second piston and cylinder operatively connected simultaneously to impart an unwind and a wind movement to said nut and screw mechanism to facilitate taking-up backlash, a control valve mechanism simultaneously to control the admission to an exhaust of fluid from both of the cylinders, and an independent work gauge for each portion of the work piece being ground operatively connected to actuate said control valve mechanism when a portion of the work piece has been ground to a predetermined size so as to impart a compensating adjustment to the truing tool to compensate for wear.

8. In a grinding machine, as claimed in claim 1, in combination with the parts and features therein specified in which the grinding wheel truing apparatus including an independent nut and screw compensating mechanism for each of the truing tool units, an independent piston and cylinder operatively connected to actuate each of said nut and screw mechanism to impart a compensating adjustment to each of said truing tools, independent means to adjust the extent of movement of each of said pistons so as to vary the extent of the compensating adjustment, a second piston and cylinder operatively connected simultaneously to impart an unwind and a wind movement to said nut and screw mechanism to facilitate taking-up backlash, a control valve mechanism simultaneously to control the admission to an exhaust of fluid from both of said cylinders, an independent work gauge for each portion of the work piece being ground which are operatively connected to actuate said control valve mechanism when a portion of the work piece has been ground to a predetermined size so as to impart a compensating adjustment to the truing tool to compensate for wear.

9. In a grinding machine, as claimed in claim 1, in which the grinding wheel truing apparatus includes an independent nut and screw compensating mechanism on each of the truing tool units, an independent piston and cylinder operatively connected to actuate each of said nut and screw mechanism to impart a compensating adjustment to each of said truing tools independent means to adjust the extent of movement of each of said pistons so as to vary the extent of the compensating adjustment, a second piston and cylinder operatively connected simultaneously to impart an unwind and a wind movement to said nut and screw mechanism to facilitate taking-up backlash, independent means to adjust the extent of movement of each of said second pistons so as to vary the extent of the unwind and the wind movements, a control valve mechanism simultaneously to control the admission to an exhaust of fluid from both sets of cylinders, and an independent work gauge for each portion of the work piece being ground operatively connected to actuate said control valve mechanism when a portion of the work piece has been ground to a predetermined size so as to impart a compensating adjustment to a truing tool to compensate for wear.

10. In a grinding machine, as claimed in claim 1, in which each of the truing tool units are provided with an adjustable clamping device to facilitate positioning the unit relative to the grinding wheels, a slidably mounted truing tool carrier on each of said units, a truing tool mounted on one end each of said carrier, a nut and screw feed mechanism interposed between the unit and carrier, and a compensating mechanism on each of the units to impart a compensating feed to said nut and screw mechanism and to simultaneously unwind and wind said nut and screw mechanism to take up the feed increment.

References Cited in the file of this patent
UNITED STATES PATENTS
Re. 24,378   Hill ________________ Oct. 15, 1957